United States Patent [19]

Van Engelen et al.

[11] Patent Number: 4,710,431
[45] Date of Patent: Dec. 1, 1987

[54] MAGNETOOPTICAL RECORDING ELEMENT AND A MAGNETOOPTICAL RECORDING DEVICE

[75] Inventors: Petrus P. J. Van Engelen; Kurt H. J. Buschow, both of Eindhoven, Netherlands

[73] Assignee: U.S. Philips Corporation, New York, N.Y.

[21] Appl. No.: 928,953

[22] Filed: Nov. 10, 1986

[30] Foreign Application Priority Data

Mar. 13, 1986 [NL] Netherlands .................. 8600647

[51] Int. Cl.$^4$ ............................................. G11B 7/24
[52] U.S. Cl. .................................. 428/457; 365/122; 428/694; 428/900
[58] Field of Search .................. 428/457, 694, 900; 369/13, 288; 365/122; 360/131, 134; 350/375, 376

[56] References Cited

U.S. PATENT DOCUMENTS 4,310,899 1/1982 Biesterbos et al. ............... 365/113
4,612,587 9/1986 Kaneko et al. ................... 360/59
4,663,066 5/1987 Fruchart et al. ................. 252/62.51

FOREIGN PATENT DOCUMENTS 128606 7/1985 Japan .
48148 3/1986 Japan .
96706 5/1986 Japan .

OTHER PUBLICATIONS

Abache et al., "Magnetic Properties of Compounds $R_2Fe_{14}B$", J. Appl. Phys. 57(1), Apr. 15, 1985, p. 4112.
Oesterreicher, H., et al., "$Fe_{14}R_2B$ Type Compounds for Magnetic Recording Applications", J. de Physique, C6, No. 9, Tome 46, pp. C6-45 to C6-48 (Sept. 1985).
Cadieu, F. J. et al., "Magnetic Properties of Sputtered Nd-Fe-B Films", J. Magnetism and Magnetic Materials, vols. 54-57, pp. 535-536 (1986).

Primary Examiner—Marion C. McCamish
Assistant Examiner—William M. Atkinson
Attorney, Agent, or Firm—Marc D. Schechter

[57] ABSTRACT

A magnetooptical recording element has a substrate bearing a magnetooptical recording layer. The recording layer is crystalline and comprises a compound of the formula $R_2T_{14}B$, wherein R is a rare earth metal or a combination of two or more rare earth metals, and T is a transition metal or a combination of two or more transition metals, in particular Fe or Co or a mixture thereof. A magnetooptical recording device comprises such a magnetooptical recording element.

8 Claims, 4 Drawing Figures

MAGNETOOPTICAL RECORDING ELEMENT AND A MAGNETOOPTICAL RECORDING DEVICE

BACKGROUND OF THE INVENTION

The invention relates to a magnetooptical recording element. The recording element comprises a substrate and a thin recording layer provided thereon. The recording lazer is an alloy of a rare earth metal, a transition metal and boron. The alloy has an intrinsic uniaxial magnetic anisotropy and an easy axis of magnetization which is perpendicular to or substantially perpendicular to the plane of the layer.

Such an optical recording element is known from Netherlands Patent Application No. 7900921 (corresponding to U.S. Pat. No. 4,310,899).

In the known recording element an amorphous recording layer is used which comprises a comparatively high content of 15-30 at.% of the element boron. The content of the transition metal, in particular Fe, is approximately 50-70 at.%. The rare earth metal, in particular Gd, is present in a quantity of 14-26 at.%.

According to Netherlands Patent Application No. 7900921, the addition of boron has the advantage that the alloy crystallizes at a higher temperature above the Curie temperature. The stability of the recording layer is thereby enhanced. Notably, the recording layer has a greater resistance to irreversible structural changes which change the magnetic properties of the layer.

Although this advantage enables the practical usability of the recording element, it should be borne in mind that an amorphous layer by nature is an unstable layer. When high requirements are imposed upon stability for a long period in use, the known element is not satisfactory. In the long run structural changes occur in the known amorphous layer, in particular as a result of the ever recurring local heating to the Curie temperature.

Another disadvantage is that the amorphous layer of the known recording element is rather sensitive to oxidation. This also adversely influences the life of the element.

SUMMARY OF THE INVENTION

It is an object of the invention to provide a magnetooptical recording element which is stable over a long lifetime.

According to one object of the invention a magnetooptical recording element is provided which remains stable and useful for many years. In particular no annoying structural changes occur in the recording layer.

Another object of the invention is that the recording layer of the magnetooptical element exhibits a large polar Kerr rotation, and hence a large $\theta_k$. This quantity, as will be explained in detail hereinafter, is of essential importance for the operation of the magnetooptical element. The reading process is based on it. A large Kerr rotation contributes to a large signal-to-noise ratio upon reading the recorded information. A large signal-to-noise ratio of, for example, 55 dB and higher at a bandwidth of 30 kHz enables reading of video information.

Still another object is that the recording layer of the magneto-optical element exhibits a favorable ellipticity ($\epsilon_k$). The value of the measured signal depends not only on the Kerr rotation but is also proportional to the ellipticity according to the formula $$\sqrt{\theta^2_k + \epsilon^2_k}.$$

The value of the Kerr rotation further depends on the wavelength of the light used during the reading process.

A further object of the invention is to provide a magnetooptical recording element having a recording layer which produces a very good Kerr rotation of light originating from an AlGaAs laser. This laser, sometimes called a semiconductor laser, has an emission wavelength of approximately 870 nm. The semiconductor laser has small dimensions and can therefore be incorporated easily and advantageously in the apparatus required for the practical use of a magnetooptical recording element.

According to the invention, these objects are achieved by means of a magnetooptical recording element in which the recording layer is a crystalline layer of a compound having the formula $$R_2T_{14}B$$

wherein R is a rare earth metal, or a combination of two or more rare earth metals, and T is a transition metal or a combination of two or more transition metals, in particular Fe or Co or mixtures thereof. When T is Fe or Co or mixtures thereof, at most 50 at.% of T may be replaced by one or more other d-transition metals, in particular by Ni, Cr, Ru or Mn.

In a favorable embodiment of the recording element according to the invention, the compound satisfies the formula $R'_2Fe_{14}B$, wherein R' is a rare earth metal or a combination of rare earth metals, in particular selected from the group consisting of Nd, Gd, and La.

In a further favorable embodiment the compound has the formula $Nd_2Fe_{14}B$.

In the magnetooptical recording element according to the invention, binary (digital) information is recorded thermomagnetically. For this purpose, the recording layer is exposed to a light beam preferably originating from an AlGaAs laser focused on the layer. The light beam is pulsed in accordance with the information to be recorded. The pulse duration is short and is, for example, from 50-500 ns. The power of the laser is, for example, from 0.5 to 5 mW.

In the exposed areas the recording layer is heated to the Curie temperature. Upon cooling, the magnetization direction of the heated area is reversed under the influence of magnetic interference fields of adjacent non-heated areas of the recording layer. The reversal of the direction of magnetization can also be produced by an external magnetic field which is directed opposite to the initial direction of magnetization. The areas (info-bits) of opposite direction of magnetization have small dimensions of, for example, from 0.5 to 5 μm.

The exposure is preferably carried out via the substrate. In that case the substrate must be transparent to the light of the light beam used. Any dust particles or other contamination on the surface of the substrate do not adversely influence the quality of reading and writing because these impurities fall beyond the depth of focus of the objective with which the light beam is focused on the recording layer.

The transparent substrate is manufactured, for example, from glass, quartz, or a transparent synthetic resin, for example polycarbonate or polymethylmethacrylate.

The surface of the substrate, on the side of the recording layer, may comprise an optically scannable groove, a so-called servo track, which usually is spiral-like. The groove may comprise a so-called heading (i.e. info-areas which are situated alternately at a higher level and at a lower level and which can be read optically by means of laser light and which comprise information with which, for example, the writing process is controlled). The magnetooptical recording of information preferably takes place in the groove.

The groove may also be provided in a separate layer of a synthetic resin provided on the substrate and consisting, for example, of a light-cured layer of acrylic acid esters. The recording layer is provided over this layer. The recording layer may be coated with a protective layer of a synthetic resin. Alternatively, two elements according to the invention may be adhered together, the recording layers facing each other.

The recorded info-bits are read magnetooptically by means of a weak, continuous, linearly polarized light beam which is focused on the recording layer. At the area of an info-bit the plane of polarization of the light beam is rotated over a given angle as a result of the magnetization. This rotation can be established and measured by means of a detector.

The rotation of the plane of polarization occurs both in a reflected light beam (and is then called Kerr rotation), and in a transmitted light beam (which is known as the Faraday rotation). The recording element according to the invention is preferably read in reflection via the substrate.

The Kerr rotation can be indicated in two ways. There is a single Kerr rotation if the measurement is carried out with respect to an area which has no magnetization. There is a double Kerr rotation if the measurement is carried out with respect to an area the magnetization of which has an opposite sign, that is the direction of magnetization of which has been rotated over 180°.

The information stored in the magnetooptical recording element can be erased by reversing the direction of magnetization of the info-areas to the original direction by using an external magnetic field which is directed opposite to the direction of magnetization of the info-areas.

The crystalline recording layer of $R_2T_{14}B$ used according to the invention is provided by means of an electroless deposition process, in particular a vapor deposition process or a sputtering process. In the vapor deposition process, an (ultra) high vacuum is used, for example a vacuum of $10^{-8}$ or $10^{-10}$ mbar. The individual elements are deposited on the substrate surface in the desired ratio.

A sputtering process, with for example the sputtering gas argon, is preferably used. During the deposition a magnetic field may be used having a field strength of, for example, 160 kA/m which is perpendicular to the plane of depositon. The substrate is preferably kept at an elevated temperature during the deposition.

It is to be noted that it is known per se from, for example, an article by F. J. Cadieu, et al entitled "Magnetic Properties of Sputtered Nd-Fe-B Films" Paper 4 G-10, *Int. Conf. on Magnetism*, San Francisco, Aug. 26–30, 1985) to use the compound $Nd_2Fe_{14}B$ as a permanent magnetic material in the form of a thin film. From an article by H. Oesterreicher, et al entitled "$Fe_{14}R_2B$ Type Compounds for Magnetic Recording Applications" (*Journal de Physique*, Collogue C 6, No. 9, Tome 46, September 1985, pp. 45–48) the potential use of compounds of the formula $R_2Fe_{14}B$ for magnetic recording purposes is recognized.

These known uses are based on phenomena and properties quite different from the magnetooptical recording described above. Important factors for magnetooptical recording are, inter alia, the Curie temperature of the recording material, the intrinsic, uniaxial anisotropy of the material having an easy axis of magnetization which is perpendicular to the plane of deposition, the light absorption coefficient, the heat conduction coefficient and the specific heat of the material, the change of the direction of magnetization upon heating by means of laser light, the value of the demagnetization field and the rotation of the plane of polarization of linearly polarized light caused by the material upon reflection and transmission (the Kerr and Faraday rotations). In the known uses, the above phenomena and properties do not play a role. Instead, for example, the energy product of the material, the BHmax, is a very important property. In BHmax, B is the magnetic flux density and H is the strength of the magnetic field.

The invention further relates to a magnetooptical recording device having a recording element which comprises a substrate and a thin recording layer provided thereon. The recording device further comprises reading and writing means. The reading and writing means comprise a source of radiation for providing a linearly polarized light beam, means to focus the light beam at a desired area of the recording layer, and a detector to measure the rotation of the plane of polarization of the light beam after reflection from or transmission through the recording layer. The recording device also includes a magnet coil for generating a magnetic field which is perpendicular to the recording layer.

According to the invention, the recording layer is a crystalline layer of a compound of the formula $R_2T_{14}B$, wherein R is a rare earth metal or a combination of two or more rare earth metals, and T is a transition metal or a combination of two or more transition metals, in particular Fe or Co, or a mixture thereof.

DESCRIPTION OF THE PREFERRED EMBODIMENTS

Figure 1:
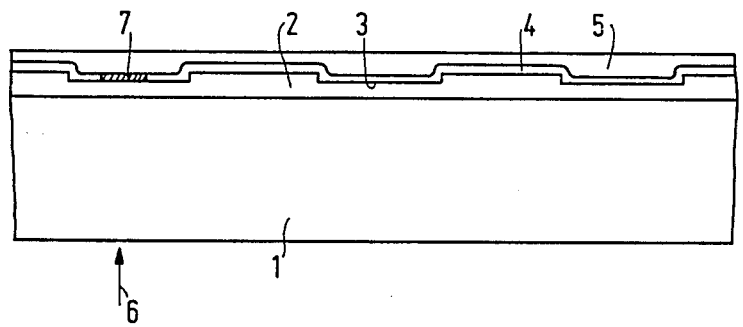
FIG. 1 is a cross-sectional view of a magnetooptical recording element according to the invention.

Referring to FIG. 1, a glass substrate plate 1 comprises a layer 2 of a light-cured acrylate synthetic resin in which a spiral-like groove 3 has been provided. The groove 3 may be provided with information areas situated alternately at a higher level and at a lower level, the so-called heading. The heading can be read in reflection by means of laser light via substrate plate 1 on the basis of phase differences.

Layer 2 may alternatively comprise a vapor-deposited layer of $SiO_2$.

A magnetooptical layer 4 having the composition $R_2T_{14}B$ is provided on layer 2. Layer 4 is a polycrystalline layer provided by an RF sputtering process performed in an argon atmosphere at 0.15 mbar in the presence of a magnetic field which is perpendicular to the surface of the layer 4. The thickness of the layer 4 is approximately 150 nm. The easy axis of magnetization of the layer 4 is perpendicular to the major surface of the substrate 1.

Layer 4 is coated with a protective layer 5 of a synthetic resin.

Information is recorded in the grooves 3 of the layer 4 by means of pulsed laser light, indicated schematically by arrow 6, which is focused on the recording layer 4 via substrate plate 1. The pulse duration is 100 ns. The laser light originates from an AlGaAs laser having an emission wavelength of 870 nm.

During the exposure, an external magnetic field is applied which is directed opposite to the direction of magnetization of layer 4. The exposed areas 7 of layer 4 are heated to the Curie temperature so that the direction of magnetization is reversed. The information bits thus obtained have a diameter of approximately 1 $\mu$m.

Figure 3B:
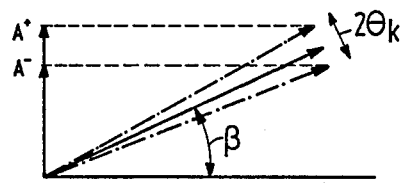
FIGS. 3a and 3b schematically show a recording device according to the invention.
Figure 3A:
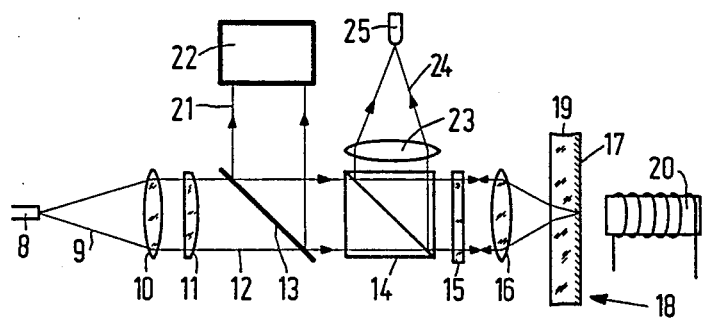

The information bits are read by means of weak laser light which is linearly polarized. The light is focused on the recording layer 4 via the substrate plate 1. Upon reflection from an information bit, the plane of polarization is rotated (Kerr rotation). The rotation is measured by a detector (FIGS. 3a and 3b). The information bits 7 can be erased by means of an external magnetic field which is directed opposite to the direction of magnetization of the information bit.

The magnetooptical properties of a number of polycrystalline compounds which satisfy the formula $R_2T_{14}B$ have been measured and are recorded in the Table below. In the Table, $\lambda$ is the wavelength of the light given in nm. 2 $\theta_k$ is the double Kerr rotation given in degrees (degr.) and measured in a field of 925 kA/m at the first negative peak in the rotation spectrum. $\sigma_s$ is the total magnetization measured in a field of 925 kA/m. $\sigma_{3d}$ is the 3d sublattice magnetization, and 2 $\theta_k/\sigma_{3d}$ is the reduced Kerr rotation.

TABLE

| Compound $R_2T_{14}B$ | $\lambda$ (nm) | $-2\theta_k$ (degr) | $\sigma_s$ (Am kg) | $\sigma_{3d}$ (Am kg) | $-2\theta_k/\sigma_{3d}$ (degr. kgA m) |
|---|---|---|---|---|---|
| $La_2Fe_{14}B$ | 1150 | 0.76 | 115 | 115 | $0.66 \times 10^{-2}$ |
| $Ce_2Fe_{14}B$ | 1050 | 0.50 | 88 | 88 | $0.57 \times 10^{-2}$ |
| $Nd_2Fe_{14}B$ | 1150 | 0.91 | 147 | 125 | $0.73 \times 10^{-2}$ |
| $Gd_2Fe_{14}B$ | 1150 | 0.67 | 76 | 115 | $0.58 \times 10^{-2}$ |
| $Lu_2Fe_{14}B$ | 1550 | 0.41 | 97 | 97 | $0.42 \times 10^{-2}$ |
| $La_2Co_{14}B$ | 1150 | 0.47 | 87 | 87 | $0.54 \times 10^{-2}$ |
| $Gd_2Co_{14}B$ | 1050 | 0.58 | 35 | 87 | $0.67 \times 10^{-2}$ |

Figure 2:
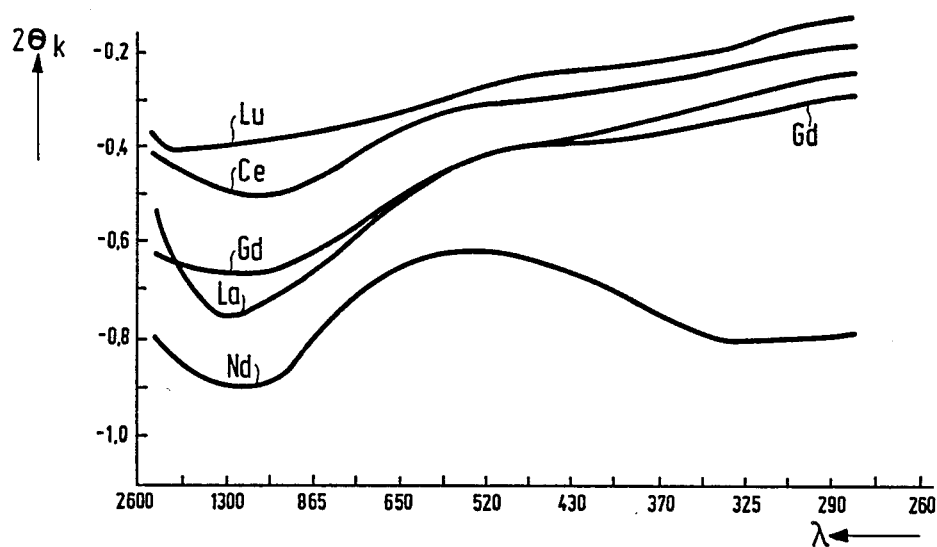
FIG. 2 is a graph showing the double Kerr rotation of the substances used in the recording element as a function of the wavelength of the light used.

In FIG. 2, the double Kerr rotation (2 $\theta_k$) in degrees of a number of crystalline compounds of the formula $R'_2Fe_{14}B$ is plotted as a function of the wavelength ($\lambda$) in nm. The Kerr rotation has been measured at room temperature in a magnetic field of 925 kA/m. The various compounds of the formula $R'_2Fe_{14}B$ are indicated in the FIG. 2 by the rare earth metal present in the compound.

It appears from FIG. 2 that the compound $Nd_2Fe_{14}B$ exhibits the largest negative Kerr rotation at all wavelengths between 2500 and 250 nm. It may also be derived from FIG. 2 that the Kerr rotation has the highest absolute values in a wavelength range from approximately 1650 nm to 830 nm. When an AlGaAs laser is used having an emission wavelength of 870 nm the Kerr rotation has a very good value.

In FIG. 3a, an AlGaAs laser 8 provides a pulsed light beam 9 having a wavelength of 870 nm. The light beam 9 passes through an objective 10 with a numerical aperture (NA) of 0.3. The astigmatism of the laser beam is corrected by a cylinder lens 11.

The parallel beam 12 from cylinder lens 11 then traverses a partially transparent mirror 13 and a polarizing beam splitter 14. Splitter 14 passes the parallel polarization component of the laser light while the perpendicular component is reflected. The transmitted linearly polarized light passes through a Faraday rotator 15 which rotates the direction of polarization over a small angle ($\frac{1}{2}\beta$). (See, also, FIG. 3b.) The linearly polarized light is then focused on the recording layer 17 of the magnetooptical recording element 18 by means of an objective 16 having a numerical aperture (NA) of 0.6.

The recording layer is a crystalline layer of a compound of the formula $R_2T_{14}B$. The recording layer is provided on a quartz substrate 19. The recording layer is exposed via the substrate 19.

In the exposed areas, the temperature of the recording layer is increased to approximately the Curie temperature by light absorption. By using a magnetic field having a strength of $4 \times 10^4$ A/m (generated by coil 20), the direction of the magnetization of the recording layer in the exposed area is rotated through 180°.

Upon reading the recorded information a weak continuous light beam from the AlGaAs laser 8 is used. The read beam follows the same light path as described above and as shown in FIG. 3a. Upon reflection of the linearly polarized light beam from an information bit of the recording layer 17, the plane of polarization is rotated over an angle $\theta_k$ (Kerr rotation) as a result of the locally varied direction of magnetization. (See, FIG. 3b.) The reflected light beam again passes through the objective 16, the Faraday rotator 15 (rotates again over $\frac{1}{2}\beta$), and then reaches the polarizing beam splitter 14 in which the parallel component is passed.

After reflection from the partially transmitting mirror 13, the parallel component 21 is returned to the control device 22 for positioning and focusing the laser light beam on the recording layer 17 upon writing information.

The perpendicular light component 24 is reflected by the polarizing beam splitter 14. Via an objective 23, the perpendicular component 24 is focused and is detected by a detector 25. Detector 25 may be, for example, an avalanche photodiode. The amplitude fluctuation (A−−A+) shown in FIG. 3b as a result of the rotation of the plane of polarization (2 $\theta_k$) provides the reading signal after quadratation.

What is claimed is:

1. A magnetooptical recording element comprising:
   a substrate;
   a thin recording layer on the substrate; and
   a heading means on the substrate for providing information for controlling the recording of information onto the recording element.
   characterized in that the recording layer consists essentially of a crystalline alloy having the composition $R_2T_{14}B$, where R is one or more rare-earth metals, T is one or more transition metals, and B is boron.

2. A magnetooptical recording element as claimed in claim 1, characterized in that T is one or more of iron and cobalt.

3. A magnetooptical recording element as claimed in claim 2, characterized in that R is one or more of neodymium, gadolinium, and lanthanum.

4. A magnetooptical recording element as claimed in claim 3, characterized in that the crystalline alloy has the composition $Nd_2Fe_{14}B$.

5. A magnetooptical recording device comprising:
a substrate;
a thin magnetized recording layer on the substrate;
means for writing information on the recording layer by optically changing the magnetization state of an area of the recording layer; and
means for reading information written on the recording layer by optically sensing the magnetization state of an area of the recording layer;
characterized in that the recording layer consists essentially of a crystalline alloy having the composition $R_2T_{14}B$, where R is one or more rare-earth metals, T is one or more transition metals, and B is boron.

6. A magnetooptical recording device as claimed in claim 5, characterized in that T is one or more of iron and cobalt.

7. A magnetooptical recording device as claimed in claim 6, characterized in that R is one or more of neodymium, gadolinium, and lanthanum.

8. A magnetooptical recording device as claimed in claim 7, characterized in that the crystalline alloy has the composition $Nd_2Fe_{14}B$.

* * * * *